US011765288B1

(12) United States Patent
Antony Muthu Rayar et al.

(10) Patent No.: US 11,765,288 B1
(45) Date of Patent: Sep. 19, 2023

(54) METHODS AND SYSTEMS FOR AUTOMATICALLY MANAGING OUTPUT SIZE OF A DOCUMENT SUBMITTED FOR SCANNING

(71) Applicant: XEROX CORPORATION, Norwalk, CT (US)

(72) Inventors: Anand Arokia Raj Antony Muthu Rayar, Chennai (IN); Sainarayanan Gopalakrishnan, Chennai (IN); Rajasekar Kanagasabai, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/747,382

(22) Filed: May 18, 2022

(51) Int. Cl.
*H04N 1/00* (2006.01)
*H04N 1/32* (2006.01)
*H04N 1/393* (2006.01)

(52) U.S. Cl.
CPC ....... *H04N 1/00474* (2013.01); *H04N 1/0057* (2013.01); *H04N 1/32133* (2013.01); *H04N 1/393* (2013.01); *H04N 2201/0094* (2013.01)

(58) Field of Classification Search
CPC ...... H04N 1/21; H04N 1/393; H04N 1/00005; H04N 1/00039; H04N 1/00045; H04N 1/00912; H04N 1/3876; H04N 2201/0082; G03G 21/02; G06F 13/28; G06T 1/60; G06T 2200/28; G06T 3/4023; G06T 2200/32; G06T 2207/10008; G06T 2207/30176; G06T 7/33; G06N 20/00; G06N 3/08; G06N 5/04; G06V 10/26; G06V 30/10; G06V 30/148; G07F 17/0014; G07F 17/26

USPC .......................................................... 358/474
See application file for complete search history.

(56) References Cited

U.S. PATENT DOCUMENTS

| | | | |
|---|---|---|---|
| 5,528,387 A * | 6/1996 | Kelly ................... | G06V 10/243 358/488 |
| 6,480,304 B1 * | 11/2002 | Os ....................... | H04N 1/00204 358/442 |
| 6,813,451 B2 * | 11/2004 | Wibbels ............... | G03G 15/234 399/45 |
| 6,944,357 B2 | 9/2005 | Bossut et al. | |
| 6,992,686 B2 | 1/2006 | Nagarajan | |

(Continued)

FOREIGN PATENT DOCUMENTS

CN 103218224 B 9/2016

*Primary Examiner* — Negussie Worku

(57) ABSTRACT

The present disclosure discloses methods and systems for automatically determining one or more optimal scan settings to manage an output size of a document submitted for scanning at a multi-function device. The method includes receiving the document for scanning from a user, wherein the document includes one or more pages having content. As scanning activity is progressed at the multi-function device, an output file size is displayed to the user via a user interface in real-time. Then, an input from the user is received on the displayed output file size. Based on the input from the user, one or more scan settings are determined to be applied on the already scanned pages and remaining pages of the document to be scanned, to manage the output size of an output scanned file to be generated. Thereafter, the determined one or more scan settings are applied such that the output size of the scanned file is in accordance with the requirement. Finally, the scanned file is output of the required size.

20 Claims, 15 Drawing Sheets

(56) References Cited

U.S. PATENT DOCUMENTS

| | | | | |
|---|---|---|---|---|
| 7,628,330 | B2* | 12/2009 | Tomita | H04N 1/32133 |
| | | | | 235/494 |
| 9,681,013 | B2* | 6/2017 | Gopalakrishnan | ........................... |
| | | | | H04N 1/00827 |
| 10,999,465 | B2* | 5/2021 | Packirisamy | H04N 1/2032 |
| 2005/0012963 | A1* | 1/2005 | Yamads | H04N 1/6072 |
| | | | | 358/2.1 |
| 2005/0275666 | A1* | 12/2005 | Nagarajan | H04N 1/00209 |
| | | | | 345/660 |
| 2006/0215204 | A1* | 9/2006 | Miyamoto | H04N 19/40 |
| | | | | 358/1.15 |
| 2007/0002391 | A1* | 1/2007 | Nagarajan | H04N 1/32641 |
| | | | | 358/426.07 |
| 2010/0082715 | A1* | 4/2010 | Dohm | G06F 3/0608 |
| | | | | 711/E12.002 |
| 2015/0271362 | A1* | 9/2015 | Shiramura | H04N 1/3877 |
| | | | | 358/1.17 |
| 2017/0111530 | A1* | 4/2017 | Gopalakrishnan | H04N 1/04 |
| 2018/0357751 | A1* | 12/2018 | Oue | G06T 3/4023 |
| 2022/0335091 | A1* | 10/2022 | Kondore | G06V 30/153 |

* cited by examiner

| Testing Results | | Existing Method | | Table 1 - Method | | Table 2 - Method | |
|---|---|---|---|---|---|---|---|
| S.No | Test Case | Quality | DPI | File Size (MB) | Quality | DPI | File Size (MB) | Quality | DPI | File Size (MB) |
| 1 | Sample-1 | Medium | 600 | 3.66 | Medium | 600 | 2.42 | Medium | 600 | 1.53 |
| 2 | | Medium | 300 | 1.17 | Medium | 300 | 0.615 | Medium | 300 | 0.498 |
| 3 | | Medium | 200 | 0.586 | Medium | 200 | 0.346 | Medium | 200 | 0.258 |

FIG. 3A

| Testing Results | | Existing Method 303 | | | Table 1 - Method 303 | | | Table 2 - Method 303 | | |
|---|---|---|---|---|---|---|---|---|---|---|
| S.No | Test Case | Quality | DPI | File Size (MB) | Quality | DPI | File Size (MB) | Quality | DPI | File Size (MB) |
| 1 | Sample-2 | Medium | 600 | 4.71 | Medium | 600 | 3.16 | Medium | 600 | 1.1 |
| 2 | | Medium | 300 | 2.14 | Medium | 300 | 0.988 | Medium | 300 | 0.584 |
| 3 | | Medium | 200 | 0.596 | Medium | 200 | 0.359 | Medium | 200 | 0.216 |

FIG. 3F

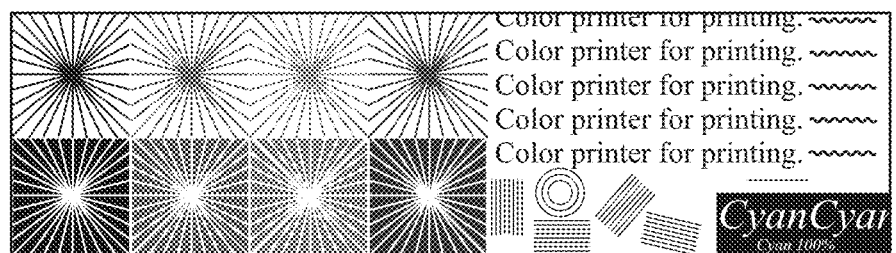
360 FIG. 3H
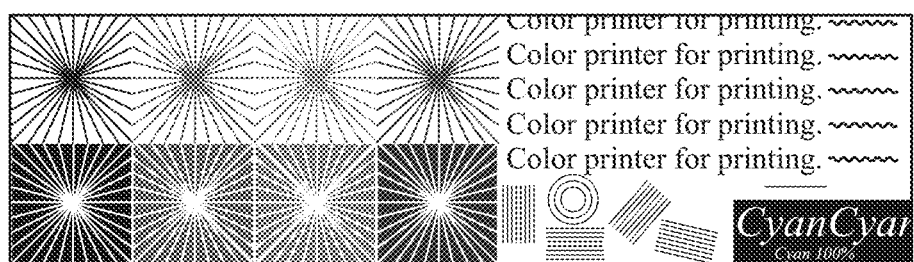
365 FIG. 3I
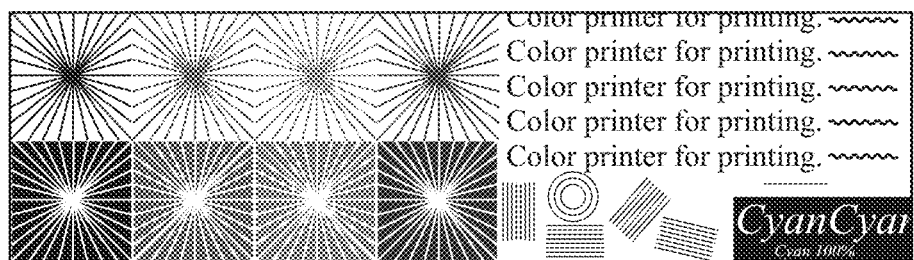
370 FIG. 3J

| Test Case | Current Method 401 | | | | Proposed Method 401 | | | |
|---|---|---|---|---|---|---|---|---|
| | User Setting | Text 403 | Image 405 | File Size in KB 407 | User Setting | Text 403 | Image 405 | File Size in KB 407 |
| 1 | 300 dpi | 300 dpi | 150 dpi | 25.5 | 300 dpi | 200 dpi | 150 dpi | 19.9 |
| 2 | 400 dpi | 400 dpi | 200 dpi | 42 | 400 dpi | 100 dpi | 200 dpi | 31.1 |

| The data shows information on different color values used by the printer. The color values can be in RGB format or LAB format | The data shows information on different color values used by the printer. The color values can be in RGB format or LAB format |
|---|---|
| 1-F | 2-F |

| The data shows information on different color values used by the printer. The color values can be in RGB format or LAB format | The data shows information on different color values used by the printer. The color values can be in RGB format or LAB format |
|---|---|
| 1-F | 2-F |

FIG. 4C

| 501 Current MRC | | | 507 File Size in KB | Proposed MRC | | | File Size in KB |
|---|---|---|---|---|---|---|---|
| User Setting | Text | Image | 23 | User Setting | Text | Image | 30.7 |
| 200 DPI | 200 DPI | 100 DPI | | 200 DPI | 400 DPI | 100 DPI | |
| 502 | 504 | 506 | 508 | | 510 | 512 | 514 |

FIG. 5A

The data shows information on different color values used by the printer. The color values can be in RGB format or LAB format. The data shows information on different color values can be in RGB format or LAB format. The data shows information on different color values used by the printer.

The data shows information on different color values used by the printer. The color values can be in RGB format or LAB format. The data shows information on different color values can be in RGB format or LAB format. The data shows information on different color values used by the printer.

The data shows information on different color values used by the printer. The color values can be in RGB format or LAB format. The data shows information on different color values can be in RGB format or LAB format. The data shows information on different color values used by the printer.

The data shows information on different color values used by the printer. The color values can be in RGB format or LAB format. The data shows information on different color values can be in RGB format or LAB format. The data shows information on different color values used by the printer.

The data shows information on different color values used by the printer. The color values can be in RGB format or LAB format. The data shows information on different color values used by the printer. The color values can be in RGB format or LAB format. The data shows information on different color values used by the printer.

The data shows information on different color values used by the printer. The color values can be in RGB format or LAB format. The data shows information on different color values used by the printer. The color values can be in RGB format or LAB format. The data shows information on different color values used by the printer.

The data shows information on different color values used by the printer. The color values can be in RGB format or LAB format. The data shows information on different color values used by the printer. The color values can be in RGB format or LAB format. The data shows information on different color values used by the printer.

The data shows information on different color values used by the printer. The color values can be in RGB format or LAB format. The data shows information on different color values used by the printer. The color values can be in RGB format or LAB format. The data shows information on different color values used by the printer.

FIG. 5C

METHODS AND SYSTEMS FOR AUTOMATICALLY MANAGING OUTPUT SIZE OF A DOCUMENT SUBMITTED FOR SCANNING

TECHNICAL FIELD

The present disclosure relates to the field of scanning. More specifically, the disclosure relates to methods and systems for automatically managing an output size of a document submitted for scanning.

BACKGROUND

When scanning a multi-page document, increase in file size is unavoidable and is also hidden from user's visual response until that scan job is done completely. Moreover, the user does not have much clue on an output size of the scanned output/file, Typically, the output file size of any scanned file depends on scan settings such as resolutions, color type, compression type and further on content of the document, Many times, the output file size may be larger than the expected size. If the file size increases beyond the required limit, it needs to be reduced. One way can be, where the user rescans the document with reduced quality setting. For example, the output file size may get smaller, but there is a scope to increase in image quality.

Other existing solutions to reduce the file size or increase quality at run time focus on reprocessing the whole scanned image without segmenting and analyzing for quality impacts. In such existing solutions, users are allowed to select/change scan settings such as resolution, color type and compression type for their scan job at the multi-function device. But most of the users are naïve and are not aware of the real impact of changing the scan settings. In view of the above, there is a need for improvised methods and systems.

SUMMARY

According to aspects illustrated herein, a method for automatically determining one or more optimal scan settings to manage an output size of a document submitted for scanning at a multi-function device is disclosed. The method includes receiving the document for scanning from a user, wherein the document includes one or more pages having content. As scanning activity is progressed at the multi-function device, an output file size is displayed to the user via a user interface in real-time. Then, an input from the user is received on the displayed output size. Based on the input from the user, one or more scan settings are determined to be applied on the already scanned pages and remaining pages of the document to be scanned, to manage the output size of an output scanned file to be generated as a result of scanning activity. Thereafter, the determined one or more scan settings are applied such that the output size of the scanned file is in accordance with the requirement. Finally, the scanned file is output of the required size.

According to aspects illustrated herein, a multi-function device for automatically determining one or more optimal scan settings to manage an output size of a document submitted for scanning is disclosed. The multi-function device includes a scanning platform, a scanner, a user interface, and a controller. The scanning platform is for receiving the document for scanning from a user, wherein the document includes one or more pages having content. The scanner is for scanning the one or more pages of the document. The user interface is for: displaying an output file size in real-time to the user as scanning activity is progressed at the mufti-function device; and receiving an input from the user on the displayed output size. The controller is for: based on the input from the user, determining one or more scan settings to be applied on the already scanned pages and remaining pages of the document to be scanned, to manage the output size of an output scanned file to be generated; applying the determined one or more scan settings such that the output size of the scanned file is in accordance with the requirement; and outputting the scanned file of the required size.

According to aspects illustrated herein, a device for automatically determining one or more optimal scan settings to manage an output size of a document submitted for scanning is disclosed. The device is for: receiving the document for scanning from a user, wherein the document includes one or more pages; determining and displaying an output file size in real-time to the user via a user interface, as scanning activity is progressed at the device; based on the output file size, determining one or more optimal scan setting for the already scanned pages and the remaining pages of the document to be scanned; applying the determined optimal scan setting to the already scanned pages and the remaining pages of the document to be scanned such that the output size in accordance with a pre-defined requirement; and outputting the scanned file of the required size.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 3A shows a JPEG quantization table with different output size values, FIG. 3C shows an output scanned file according to existing solutions, while

FIG. 3F shows another JPEG quantization table with different output size values, FIG. 3H shows an output scanned file according to existing solutions, while FIGS. 3I and 3J show output scanned files according to the present disclosure.

FIG. 4A shows a table with different output size values, FIG. 4B shows an output scanned file according to existing solutions, while FIG. 4C shows output scanned files according to the present disclosure.

FIG. 5A shows a table with different output size values, FIG. 5B shows an output scanned file according to existing solutions, while FIG. 5C shows output scanned files according to the present disclosure.

DESCRIPTION

Figure 1:
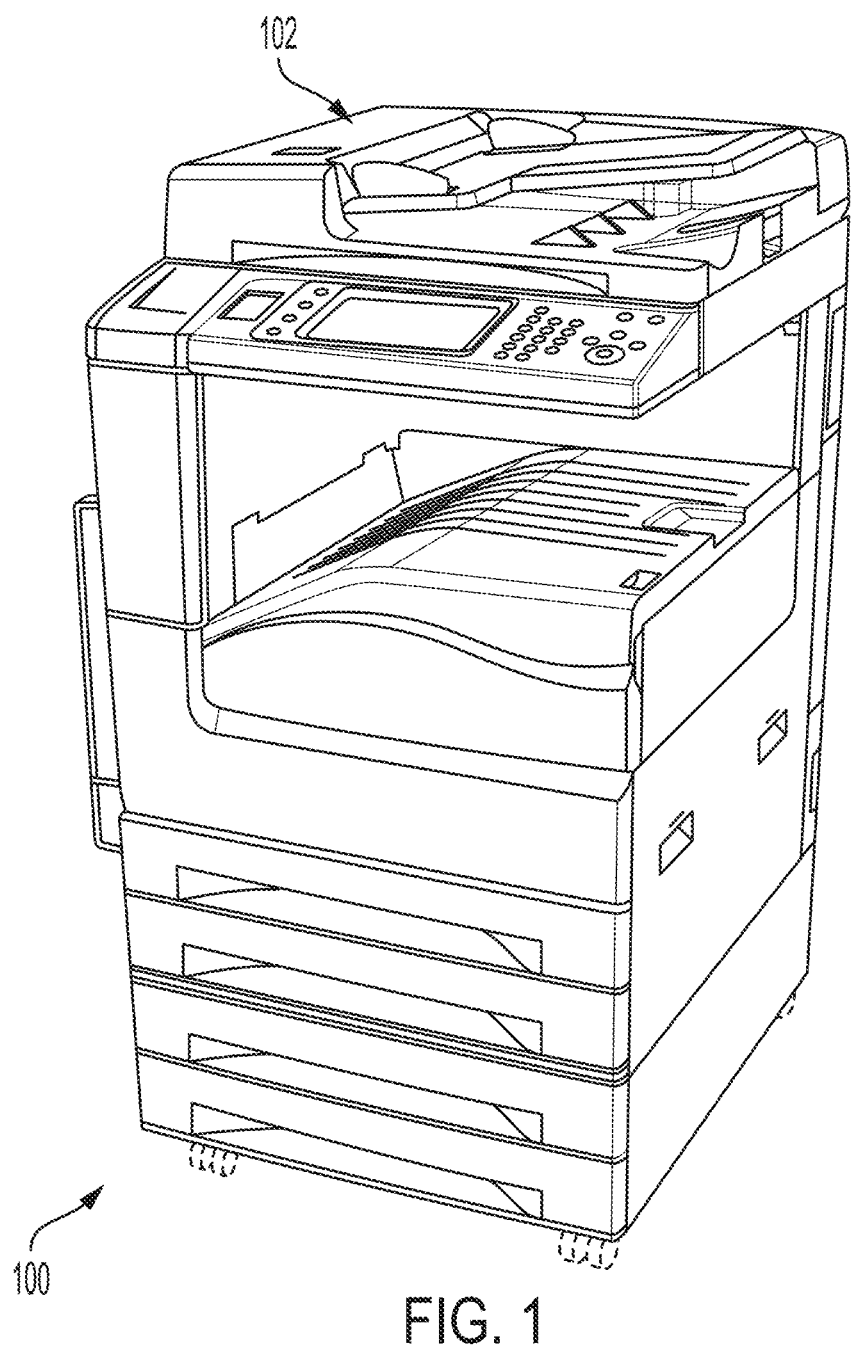
FIG. 1 shows an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, scanning, and so forth. The multi-function device may include software, hardware, firmware, or a combination thereof. In context of the current disclosure, the multi-function device automatically optimizes an output size of a document submitted for scanning such that the output scanned file can be sent via an email, stored over a network location, stored over a file server, stored in a portable storage device such as USB, stored over a cloud location and so on. The output size optimization may include increase or decrease the output size of the scanned file. The output size optimization may be performed based on the requirement such as user's requirement, requirement of an organization, for example, system policy, organization policy, or the like.

The term "document" refers to a document submitted for scanning, having one or more pages including content. The content can be in the form of text, image, graphics, or a combination thereof. The document can be in physical form, such as printed on paper. The document submitted for scanning may be referred to as an input document.

The document upon scanning refers to a scanned output/file. The scanned file is in a virtual or software form (embodied in a software file). The virtual form can also be referred to as a digital form or an electronic version. The scanned file can be referred to as output scanned file or scanned output. The scanned file can be in desired format such as MRC, known as Mixed or Multiple Raster Content (MRC) file format. The MRC is a format storing compressed images into at least two components, namely text layer component and an Image layer, A portion of the document when scanned refers to one or more scanned pages.

The term "output size" refers to the output size of a portion of the scanned file (i.e., scanned pages while scanning is in progress) and/or the whole scanned file (after complete scanning). The output size can be measured in KB, MB, or other units without limiting the scope of the disclosure.

The term "scan settings" refer to one or more parameters required/to be applied while scanning the document. Some of the parameters may be provided by the user such as orientation, color, etc. and/or some parameters may be set at the mufti-function device by default or may be automatically determined by the mufti-function device based on the document submitted for scanning. Various examples of the scan settings may include, but are not limited to, 2-side scanning/1-side scanning, orientation, output color, resolution/DPI, compression type such as JPEG, JBIG2, size of the content, required output size, threshold size, or the like. In context of the current disclosure, the scan settings that are automatically determined may relate to resolution/DPI, compression type, content size, or a combination thereof. The scan settings are applied in combination with each other, to pages of the document such that the scanned output is of required quality and size. In other words, the scanned output is of required size without affecting the quality of scanned content such as image, text etc.

The terms "optimal" or "optimized" shall be construed broadly, reflecting a given practical context (including the properties of an individual multi-function device and/or scan job) and perhaps competing multiple output priorities or goals for a given situation. For example, the optimal scan setting for a document having more of images may be different from the optimal scan setting for a document having a combination of images and text. In further example, the optimal scan setting for a document having smaller text size can be increase in DPI, while the optimal scan setting for a document having combinational pages/content (image content and textual content) can be decrease in DPI for image layer/content. The optimal scan settings may be determined such that the output size can be within the required/defined limit.

The term "medium" refers to medium compression such that the scanned output may be of medium quality. By default, the multi-function devices are set on medium compression. Some exemplary DPI values at medium compression may be without any limitation such as 200 DPI, 300 DPI, and 600 DPI. More is the compression, more is the size of the scanned output. For example, medium compression refers that the scanned file size is "Normal" irrespective of any DPI, The term "low" refers to low compression such that the scanned output may be of high quality and file size may be high, Some exemplary DPI values at low compression may be without any limitation such as 100 DPI, For example, low compression refers that the scanned file size is "High" irrespective of any DPI. The term "high" refers to high compression such that the scanned output may be of low quality and file size may be low. Some exemplary DPI values at high compression may be without any limitation such as, 1440 DPI, 2400 DPI, 2880 DPI and so on. For example, high compression refers that the scanned file size is "Low" irrespective of any DPI.

Overview

The present disclosure discloses methods and systems for intelligently determine a way to optimize an output size of a document submitted for scanning based on user's requirement. The methods and systems continuously monitor and display an output size of the document getting scanned at a multi-function device, Based on user's input to the output size, the methods and systems automatically determine a pre-defined scan setting/method/algorithm to be applied for optimizing the output size of the document getting scanned. Few exemplary algorithms may include MPEG quantization algorithms, different compression algorithms for text layer and image layer and resolution /DPI-based algorithms. In one example, the pre-defined scan setting is determined based on the type of content in the document. Then, the determined pre-defined scan setting is applied to the document getting scanned (pages already scanned or pages to be scanned) to manage output size of the scanned file. This way, the overall output size of the scanned file remains within the desired limit and/or requirement.

The present disclosure proposes a user-friendly solution to manage the output size of the document getting scanned. The real-time monitoring and display of the output size allow the user to control the output size when multi-page scan job is in progress. For example, if the user finds the output size is increasing compared to his expectation or if he finds the output size is lower than his expectation or requirement, the user is suggested with optimal scan settings intelligently. Further, the user is allowed to switch the scan setting options such as resolutions, compression type, color type etc., for optimal output size. Here, the suggested scan settings are applied to all the pages of the document appropriately i.e., pages of the document already scanned and for the pages to be scanned. In some implementations, different scan settings can be applied to different pages of the document getting scanned, without limiting the scope of disclosure.

The methods and systems monitor the size of the document getting scanned in real-time such that the output size remains within the required limit and the user does not need to rescan the document because of exceeding output size limit.

Exemplary Environment

FIG. 1 illustrates an exemplary environment 100 in which various embodiments of the disclosure can be practiced. FIG. 1 is shown to include a multi-function device 102 that performs one or more functionalities such as scanning, printing, copying, faxing, imaging, or other functionalities. In context of the current disclosure, the multi-function device 102 continuously monitors size of a document submitted for scanning and automatically optimizes an output size of the document based on the requirement of the user and/or organization. Specifically, the multi-function device 102 automatically changes one or more scan settings for the document submitted for scanning. The scan settings can be changed anytime during the scan activity based on an input from the user. Alternatively, the scan settings can be changed automatically when the multi-function device 102 sees the output size is exceeding the defined limit/requirement.

In operation, the user submits the document for scanning at the multi-function device 102. The document may include one or more pages. The document may further include content in the form of image, graphics, text, or a combination thereof. At the time of scanning, the user submits one or more scan settings/parameters such as file size, resolution/DPI (Dots Per Inch), compression, double side/single side, color/black & white, scanning destination and so on. Alternatively, the multi-function device 102 automatically scans the document at default scan setting. The default scan setting can be defined by an admin of the multi-function device 102, and/or can be pre-defined at the multi-function device 102.

Post submitting, the multi-function device 102 initiates scanning the document page by page. While scanning, the multi-function device 102 continuously monitors size of the scanned pages/file and displays the progress of the scanned pages and size to the user via a user interface of the multi-function device 102. If the output size is not as per the requirement, the user communicates the same to the multi-function device 102. Based on the user input, the multi-function device 102 analyzes the scanned pages, determines an optimal scan setting/algorithm/method to be applied to the pages already scanned and remaining pages to be scanned for the required output size. The determined scan setting can be one or more of: JPEG quantization setting, different compression techniques setting or CPI-based setting. The scan setting can be determined based on the type of content in the scanned pages/document. Once determined, the multi-function device 102 applies the determined scan setting to the already scanned pages and remaining pages to be scanned such that the output size of the final scanned file is as per the requirement and/or within the desired limit. This way, the multi-function device 102 automatically manages the output size of the document submitted for scanning.

Exemplary System

Figure 2:
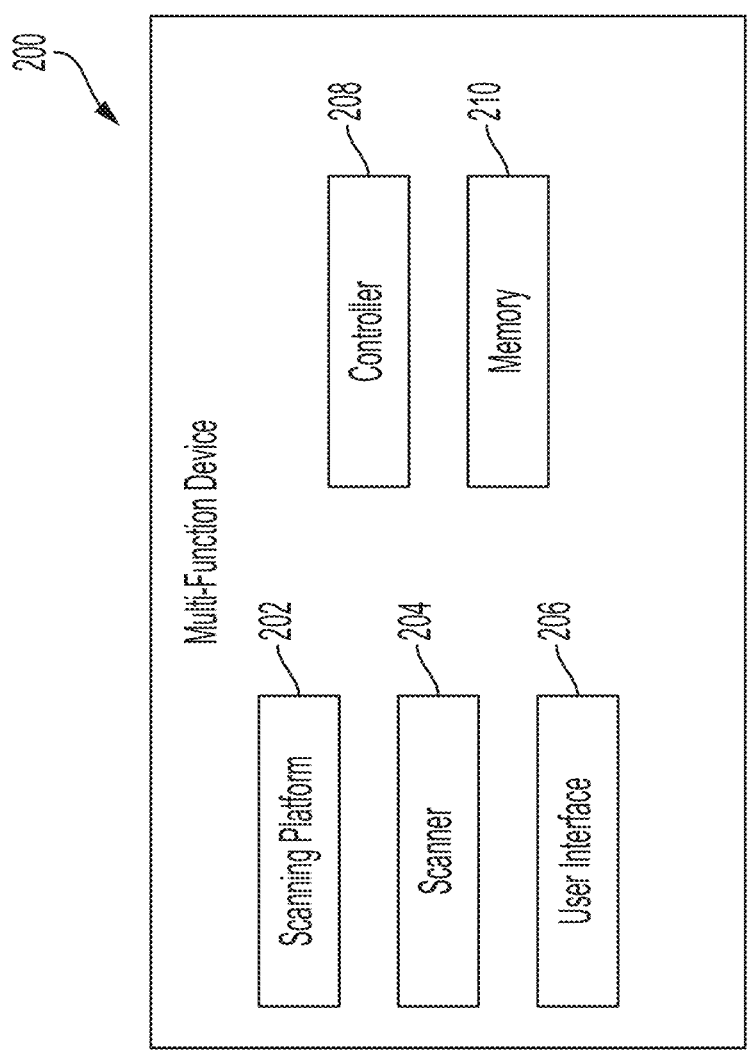
FIG. 2 is a block diagram illustrating various components of a multi-function device, in accordance with an embodiment of the present disclosure.

FIG. 2 is a multi-function device 200 for automatically determining one or more scan settings for a document submitted for scanning. The determined scan settings are applied to manage an output size of the document submitted for scanning or to manage an output size of a scanned file to be generated as a result of scanning activity at the multi-function device 200. The multi-function device 200 includes a scanning platform 202, a scanner 204, a user interface 206, a controller 208, and a memory 210. The components 202-210 are connected to each other via a conventional bus or a later developed protocol. The components 202-210 communicate with each other for performing various functions of the present disclosure. The multi-function device 200 may further include additional component(s) as required to implement the present disclosure.

In operation, the user submits a document for scanning at the scanning platform 202. The document includes one or more pages having content, the content can be in the form of text, image, graphics, or a combination thereof. The scanning platform 202 can be a platen where the document once submitted needs to be manually flipped by the user. The scanning platform 202 can be an automatic document handler (ADH), where once the document is submitted can be automatically flipped by the ADH. Post submitting, the scanning platform 202 receives the document for scanning.

After submitting the document for scanning, the user inputs one or more scan parameters for scanning through the user interface 206. Various examples of the scan parameters can be color/black&white, one side/double-side, resolution, output size and so on. Alternatively, the multi-function device 200 considers default scan parameters/settings for scanning the document as initially set by an admin or at the time of manufacturing the multi-function device 200, without deviating the scope of the disclosure. In some examples, the multi-function device 200 may have an internal policy that allows maximum output size for documents submitted for scanning. Post receiving the input from the user, the controller 208 triggers the scanner 204 to initiate scanning activity. The scanner 204 starts scanning one or more pages of the submitted document.

While scanning activity is progressed at the mufti-function device 200, the controller 208 determines and monitors the number of pages getting scanned by the scanner 204 and an output size. Specifically, the controller 208 determines/calculates the output size basis the pages already scanned at the mufti-function device 200. The controller 208 then displays the output size in real-time to the user through the user interface 206. Along with this, the controller 208 displays the number of pages scanned by the scanner 204, for example, 2 pages scanned, 4 pages scanned and so on. In other examples, the controller 208 may display progress of the scanning activity to the user such as 10% scan completed, 25% scan completed and so on. The controller 208 displays the output size of the scanned pages for user's consideration.

While displaying the output size and the number of scanned pages, the controller 208 provides an option to optimize the output size. The option to optimize the output size can be displayed to the user through the user interface 206.

If the user wishes to optimize (such as increase or decrease) the output size, the user can submit his input through the user interface 206. For example, if the user confirms to optimize the output size, the controller 208 proceeds further. If the user is Ok with the displayed output size, the controller 208 requests the scanner 204 to continue with the scanning activity based on the set scan parameters.

In context of the current disclosure, the user confirms to optimize the output size. Alternatively, the controller 208 may automatically decide to optimize the output size. Based on this, the controller 208 determines one or more scan settings to be applied on the already scanned pages and remaining pages of the document to be scanned, to manage the output size of scanned file/output. The scan settings to be applied are determined based on the type of content in the scanned pages/document. One or more exemplary scan settings/methods to adjust the output size may include—(i) the use of different JPEG quantization tables, (ii) segmenting the images and then using optimal methods to adjust each layer such as image layer and text layer, and (iii) adjusting the scan resolution for segments including textual content. For example, if the document includes more of image content, then JPEG quantization setting is applied. In another example, if the document includes a combination of image content and textual content, then different compression techniques are applied on the image layer and the text layer. In further example, if the document includes more of textual content, then resolution of textual content may be changed. Each of the scan settings/method will be discussed below in detail.

Here, the already scanned pages are stored in a temporary buffer till the whole scanning activity is finished. The scanned pages in the buffer are raw scanned pages. In some implementations, the raw scanned pages/scanned pages are analyzed to determine the type of content. The controller 208 then performs segmentation techniques on the scanned pages to determine whether the content is textual content, image content, or a combination of the textual content and the image content. Based on the type of content in the already scanned pages, the controller 208 determines, suggests, and displays an optimal scan setting to the user.

JPEG Quantization-Based Scan Setting

If the already scanned pages have more of image content, then the controller 208 determines JPEG quantization-based setting to be applied, Specifically, JPEG quantization setting is applied on the already scanned pages and remaining pages of the document to be scanned. JPEG quantization tables may be defined based on different compressions such as low compression, medium compression, and high compression. One or more exemplary quantization tables indicating different compression types and corresponding DPI values along with different output sizes are shown in FIGS. 3A and 3F. An exemplary table such as 300 is shown in FIG. 3A, where the table 300 includes one or more scan setting parameters such as quality (marked as 301), DPI (marked as 303), and file size (305). For each of the scan setting parameters, various values are included such as "medium" compression for the parameter quality (301), "200" value for the parameter DPI (303) and "0.346" for the scan parameter file size (305). The table-1 Method shows various scan settings for medium compression, with corresponding different DPI values such as 600, 300, 200 and output size such as 2.42, 0.615 and 0.346 (size in MB). The table-2 Method further shows others scan settings for medium compression, with corresponding different DPI values such as 600, 300, 200 and output size such as 1.53, 0.498 and 0.256 (size in MB).

Similarly, another table 340 in FIG. 3F shows different DPI values such as 600, 300, 200 with corresponding output size such as 3.16, 0.988, 0.359 (size in MB) for medium compression (refer to Table-1 Method). These are just exemplary tables, but the disclosure can include other tables for low compression types, high compression types with different DPI values and corresponding output sizes.

Figure 3B:
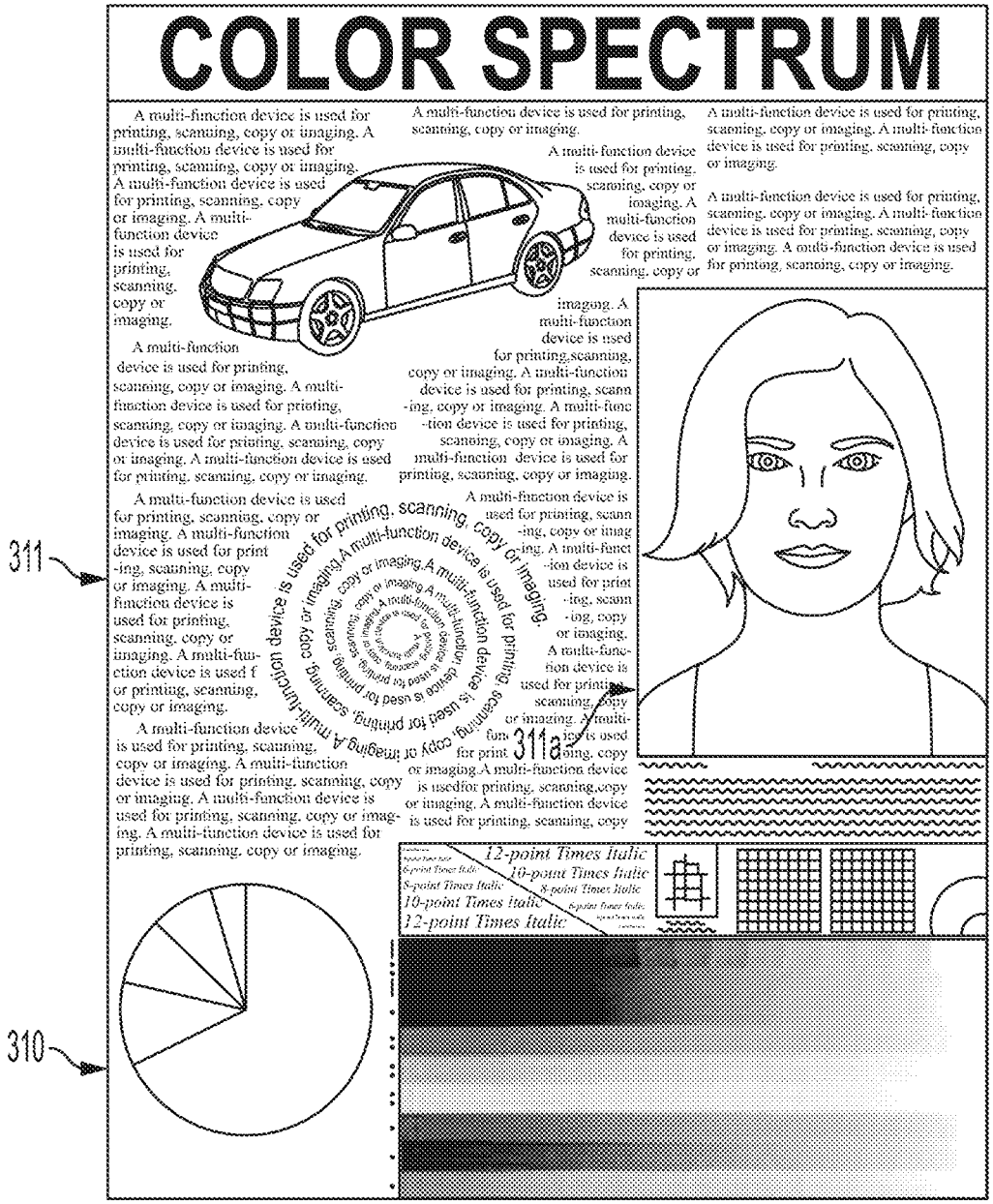
FIG. 3B shows a page of a document submitted for scanning.
Figure 3C:
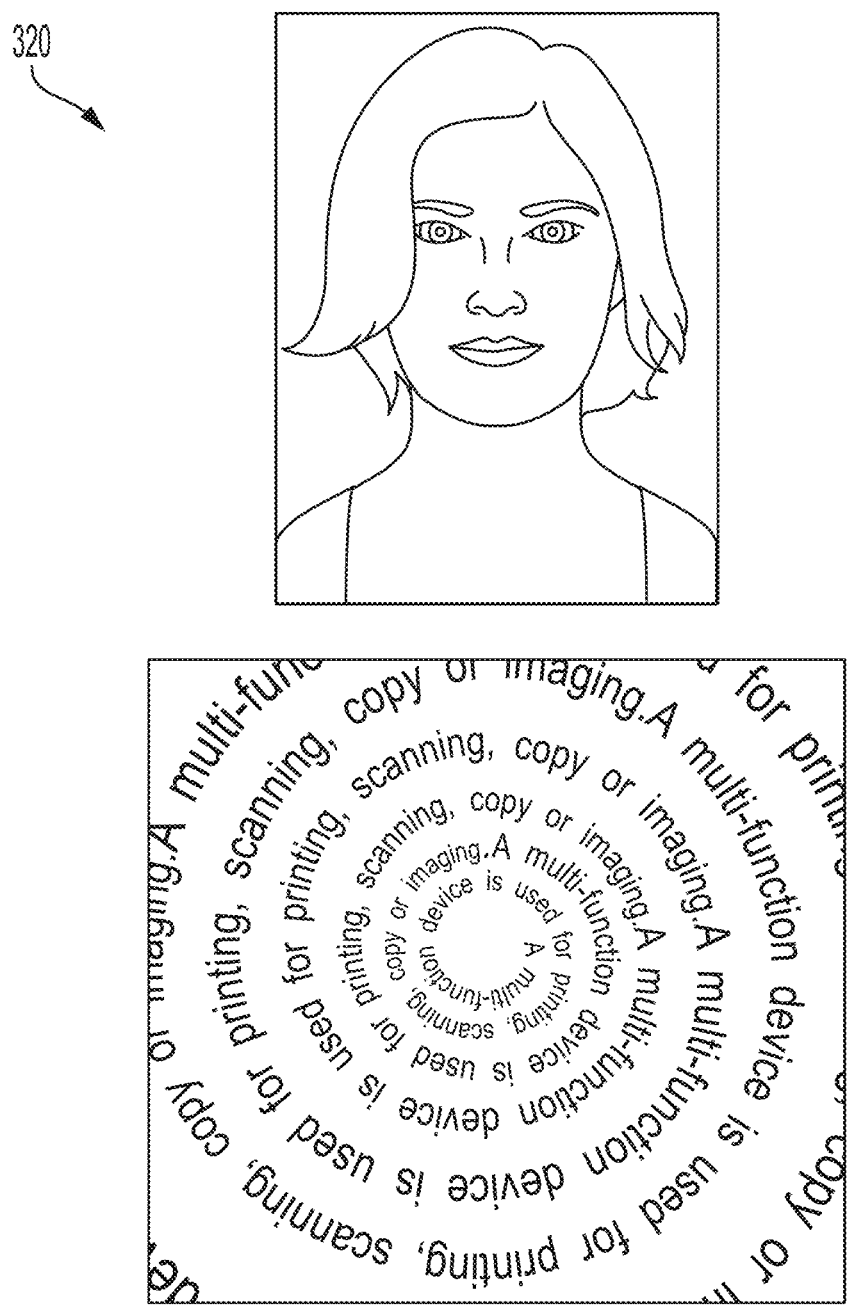
Figure 3D:
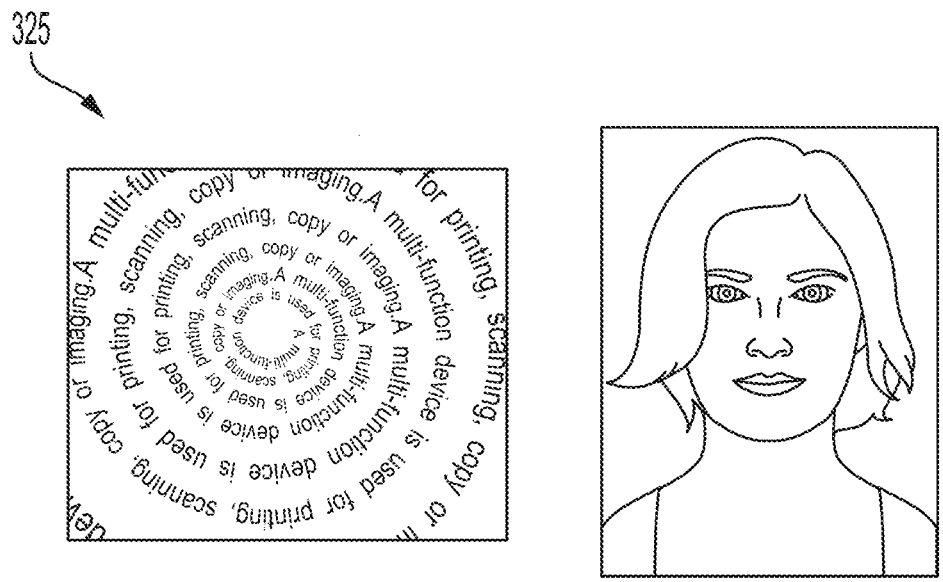
FIGS. 3D and 3E show output scanned files according to the present disclosure.
Figure 3E:
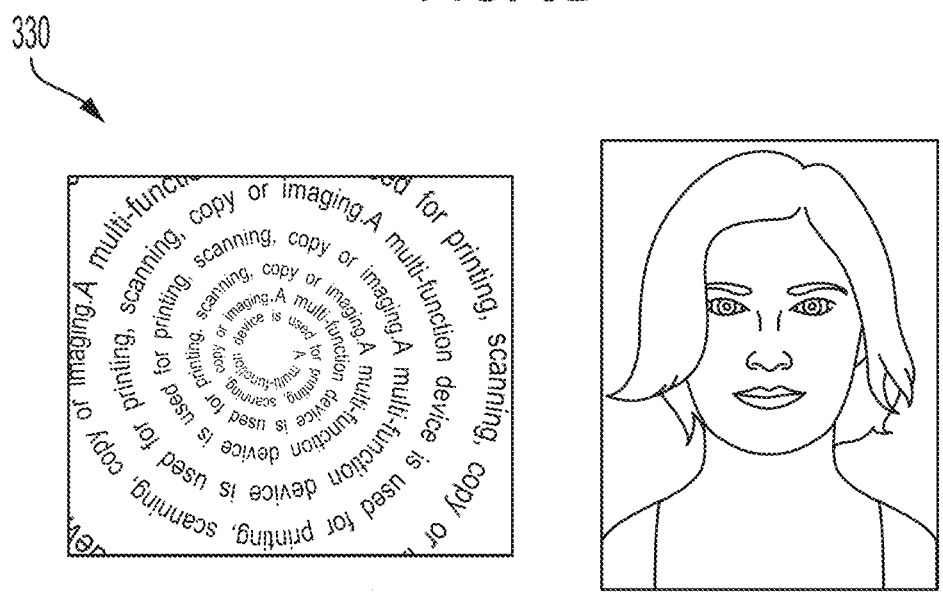

In FIG. 3B, an exemplary page 311 of a document 310 is shown. By default, the document 310 is scanned at 200 DPI (marked as 302 in FIG. 3A) with medium quality compression. A portion 311a of the document 310 when scanned at default scan settings/existing scan settings is shown in FIG. 3C as 320, where the output size is of 0.586 MB (marked as 304 in FIG. 3A). In context of the current disclosure, a portion 311a of the document 310 when scanned according to the proposed scan setting (as shown in table-1 Method of FIG. 3A) is shown in FIG. 3D as 325, where the output size of the scanned file is. 346 MB (marked as 306 in FIG. 3A) which is lesser than the output size of the default scan setting/existing scan setting, without affecting image and text quality of the scanned output. In another example, a portion 311a of the document 310 when scanned with proposed scan setting (as shown in table-2 method of FIG. 3A) is output in FIG. 3E as 330, where the output size is of .258 MB (marked as 308) which is again lesser than the output size according to the default scan setting/existing scan setting, without affecting image and text quality. The output (marked as 320 in FIG. 3C) according to the existing solutions when compared with the output(s) (marked as 325 in FIG. 3D and 330 in FIG. 3E) according to the present disclosure have the same scan quality but the output size of the scanned outputs (marked as 325 and 330) is lesser than the output size of the scanned output 320 of FIG. 3C. This way, the controller 208 may apply any of the scan setting as defined in the table-1 or table-2 (marked as 300) of FIG. 3A in order to manage the output size.

Another exemplary table such as 340 is shown in FIG. 3F, where the table 340 includes one or more scan setting parameters such as quality (marked as 301), DPI (marked as 303), and file size (305). For each of the scan setting parameters, various values are included such as "medium" compression for the parameter quality (301), "600" value for the parameter DPI (303) and "3.16" for the scan parameter file size (305). The table-1 method of the present disclosure shows various scan settings for medium compression, with corresponding different DPI values such as 600, 300, 200 and output size such as 3.16, 0.988 and 0.359 (size in MB). The table 2 method of the present disclosure further shows others scan settings for medium compression, with corresponding different DPI values such as 600, 300, 200 and output size such as 1.1, 0.584 and 0.216 (size in MB).

Figure 3G:
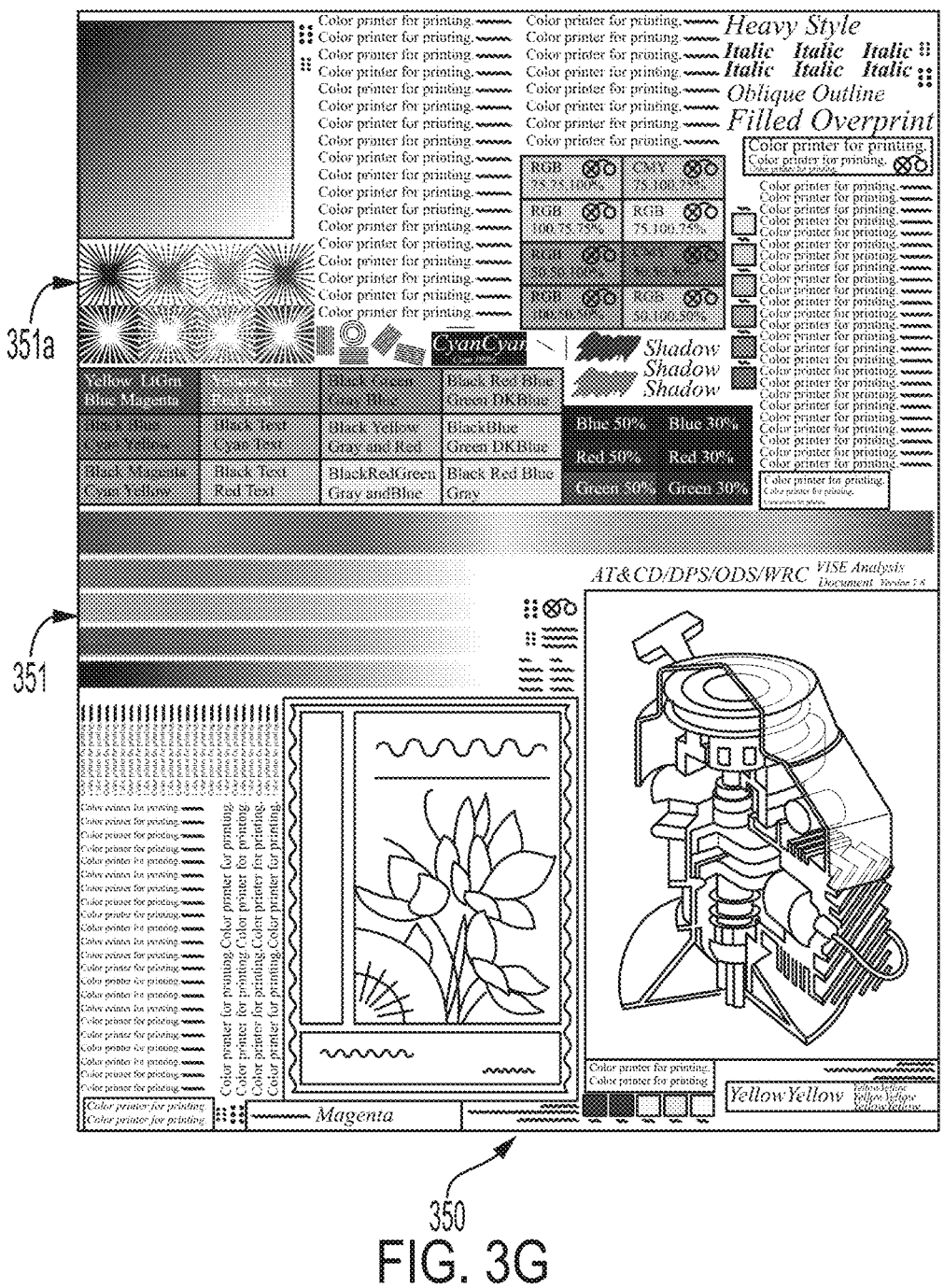
FIG. 3G shows a page of another document submitted for scanning.

In FIG. 3G, an exemplary page 351 of a document 350 is shown. By default, the document 350 is scanned at 600 DPI with medium compression. A portion 351a of the page 351 when scanned at default scan settings (DPI 600, marked as 342) is shown in FIG. 3H as 360, where the output size is of 4.71 MB (marked as 344 in FIG. 3F). In context of the current disclosure, a portion 351a of the page 351 when scanned with the proposed scan setting (as shown in FIG. 3F) is shown as 365 in FIG. 3I. Here, the output size is of 3.16 MB (marked as 346 in FIG. 3F) which is lesser than the output size 4.71 MB (marked as 344 in FIG. 3F) as given by the default scan setting without affecting image and text quality. Similarly, 351a of the page 351 when scanned according to another proposed scan setting (as shown in FIG. 3F) is shown as 370 in FIG. 3J, where the output size is of 1.1 MB (marked as 348 in FIG. 3F) which is again lesser than the output size 4.71 MB (marked as 344 in FIG. 3F) of the default scan setting, without affecting image and text quality.

The scanned output (marked as 360 in FIG. 3H) according to the existing solution when compared with the scanned output(s) (marked as 365 in FIGS. 3I and 370 in FIG. 3J) according to the present disclosure have the same scan quality but the output size of the scanned outputs 365 and 370 is lesser than the output size of the scanned output 360 of FIG. 3H. This way, the controller 208 may apply any of the scan setting as shown in table 300 (table 1 method or table 2 method) of FIG. 3A or table 340 (table 1 method or table 2 method) of FIG. 3F. to manage the output size of scanned output/file.

Different Compression-Based Scan Setting

Table 400 of FIG. 4A shows various scan parameters such as user setting 401, text 403, image 405, file size 407. For each of the scan setting parameters, various values are included such as 300 DPI for the parameter user setting (401), 200 DPI value for the parameter text (403), 150 DPI value for the parameter image (405) and 19.9 for the scan parameter file size (407). These values are indicated under the proposed method of the table 400.

If the already scanned pages have a combination of text content and image content, then different compression settings are applied for the image content and the textual content. For example, for the image content, JBIG2 compression is applied and for the textual content, JPEG compression is applied. According to current method or existing method, when a document is scanned at default scan setting at 300 DPI, 300 DPI (marked as 402) is assigned to the textual content and 150 DPI (marked as 404) is assigned to the image content where the output size of the scanned file is 25.5 KB (marked as 406).

As clearly seen in the table of FIG. 4A, 200 DPI (marked as 408) is assigned to the textual content and 150 DPI (marked as 410) is assigned to the image content that results into output size of 19.9 KB (marked as 412) which is lesser than the output size according to default scan setting of the existing method. In further example when the document is scanned according to the proposed solution, 100 DPI (marked as 414) is assigned to the textual content and 200 DPI (marked as 416) is assigned to the image content that results into output size of 31.1 KB (marked as 418) which is lesser than the output size given by default scan setting of the existing method. The scanned output when the document is scanned according to default scan setting is shown as 420 in FIG. 4B, whereas the scanned output when the document is scanned according to proposed scan setting is shown as 430 in FIG. 4C.

DPI-Based Scan Setting

Table 500 of FIG. 5A shows various scan parameters such as user setting 501, text 503, image 505, file size 507. For each of the scan setting parameters, various values are included such as 200 DPI for the parameter user setting (501), 400 DPI value for the parameter text (503), 100 DPI value for the parameter image (505) and 30.7 for the scan parameter file size (507). These values are shown under the proposed MR method of the table 500.

In further example, it can be considered that a document having more of text content is getting scanned. In such cases, the controller 208 enhances DPI of the textual content. Before enhancing the DPI value, text size of the content is analyzed first. Based on the text size, DPI value may be changed of the text content. As seen when the document is scanned at default scan setting of existing method at 200 DPI (marked as 502), 200 DPI (marked as 504) is assigned to the textual content and 100 DPI (marked as 506) is assigned to the image content where the output size of the scanned file is 23 KB (marked as 508). But if the text size is smaller, there may be quality loss of scanned output. According to the present disclosure, the controller 208 first analyzes the text size. For example, if the text size is smaller font, then the DPI of the smaller text size is scaled from 200 DPI to 400 DPI (marked as 510) for the textual content while no changes in the image content are made (marked as 512). Here the output size may be increased from 23 KB to 30.7 KB (marked as 514) but here good quality of textual content is output in comparison to the existing methods/output. Specifically, if text size is more than a threshold value, then low DPI is assigned to those text. Similarly, if the text size less than a threshold value, then high DPI is assigned to those text. The threshold value may vary based on resolution. The scanned output when the document is scanned according to default scan setting of existing method is shown as 515 in FIG. 5B whereas the scanned output when the document is scanned according to proposed scan setting is shown as 520 in FIG. 5C.

This way, the controller 208 automatically determines optimal scan setting for the scanned pages/document and applies the determined scan setting in order to optimize the output size without compromising the quality of the scanned output/file.

The controller 208 continuously monitors and displays the output size of the scanned file till the document is scanned completely. Once determined, the controller 208 applies the determined scan setting such that the output size of the scanned file is in accordance with the requirement. Finally, the controller 208 outputs the scanned file of the required size. The scanned file is output of the required size without requiring any reprocessing of the document/scanned pages or without requiring any rescanning by the user. Also, the user technical knowledge of knowing the actual impact of changing resolution/DPI, compression, etc. is not needed.

The controller 208 then sends the output scanned file to a desired destination such as email, network location, cloud location, server, a portable storage device such as USB. Here, the user provides required details such as email address, network location, cloud location details, server details or attaches the portable storage device to the multi-function device 200 based on the requirement. Finally, the output scanned file is sent to the destination. This way, the multi-function device 200 ensures the scanned file is generated of the required size as per the policy defined or otherwise as required by the user.

Although FIG. 2 is discussed wrt to decreasing the output size, but the disclosure is equally applicable for increasing the output size such that the output size of the scanned file is within the defined limit/requirement and without affecting the quality of the scanned file.

The user interface 206 can be used for providing inputs to the multi-function device 200 and/or can be used for displaying information. For example, the user uses the user interface 206 to input various scan parameters as discussed above. The user can further make any selection of the various options through the user interface 206. In another example, the user interface 206 displays various information to the user such as the number of pages getting scanned to the user in real-time, output size, progress of the scan activity at the multi-function device 200. The details are displayed to the user in real-time.

The memory 210 stores various information such as scan parameters, optimal scan settings, JPEG scan quantization tables, compression tables and other details. The stored details can be retrieved by the controller 208 for implementing the current disclosure. The details discussed here is exemplary in nature and other details relevant for implementing the current disclosure can be stored in the memory 210.

Although the disclosure is discussed with respect to the multi-function device 200, the disclosure can be implemented at other equivalent devices such as scanner. Here the scanner implements all functionalities as discussed above in FIG. 2.

In other implementations, the disclosure can be implemented at a device where the device is a mobile device with image capturing facilities. The mobile device receives the document, scans pages of the document, determines optimal scan setting/method to be applied when the output size crosses a pre-defined limit/requirement and finally applies the determined scan setting to all scanned pages and other pages of the document. Finally, the mobile device generates an output scanned file of the required size.

Exemplary Flowchart

Figure 6:
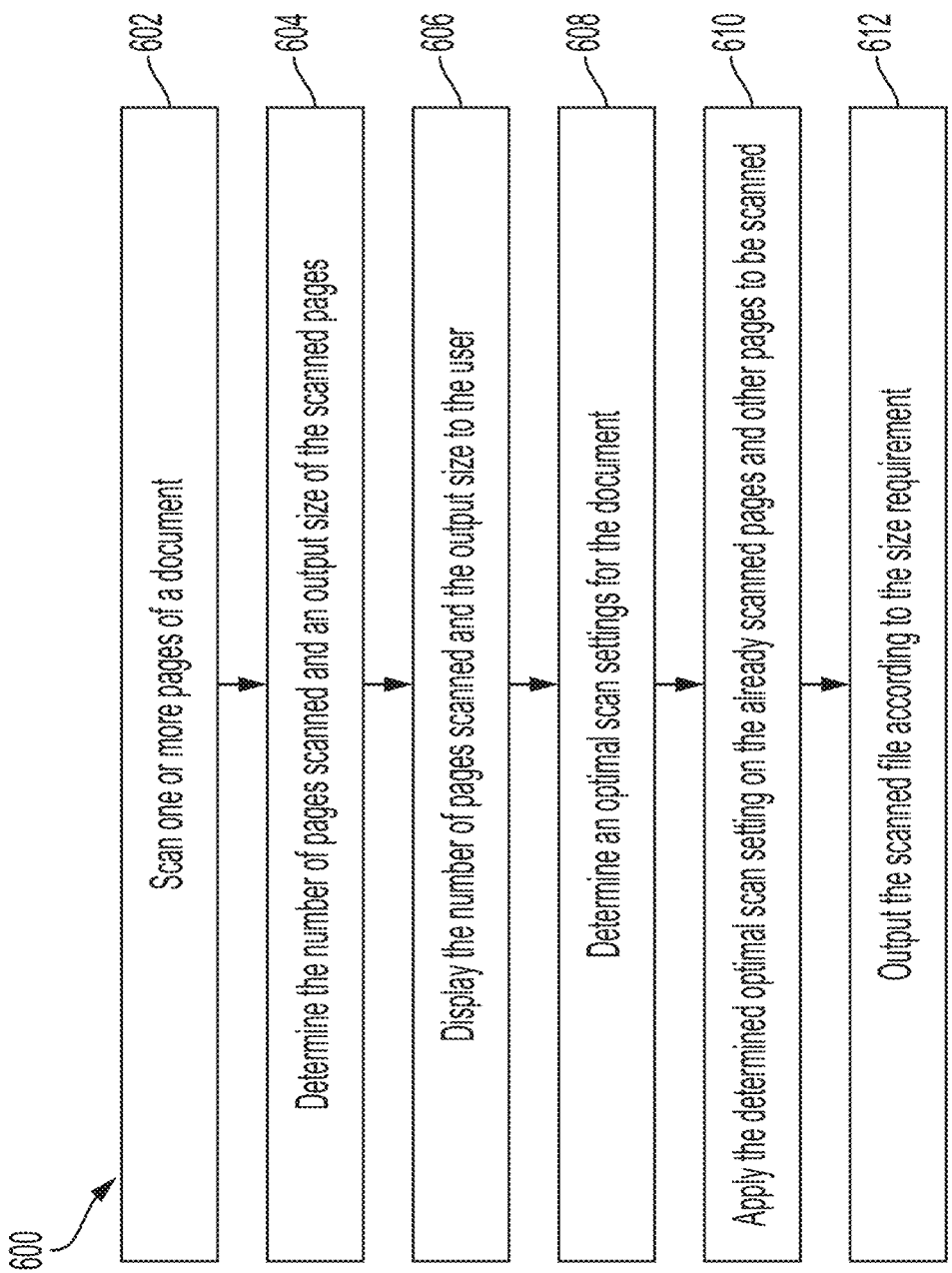
FIG. 6 is a method flowchart for automatically determining one or more scan settings for a document submitted for scanning such that output size of the document post scanning is of the required size.

FIG. 6 is a method flowchart 600 for optimizing an output size of a document submitted for scanning. The size optimization may include increase or decrease the output size based on the user requirement and/or organization requirement. The method 600 can be implemented at a multi-function device such as 102, 200, a scanner, or any device with scanning functionalities/image capturing functionalities.

Initially, the user submits a document for scanning at the multi-function device. The document includes one or more pages having content in the form of text, images, graphics, or a combination thereof. Post submitting the document for scanning, the user initiates scanning via pressing a scan button provided on the multi-function device or via a user interface of the multi-function device. At 602, one or more pages of the document are scanned. The scanned pages are stored temporarily in a buffer for later applying image processing techniques etc. As scanning activity is progressed, the number of pages getting scanned at the multi-function device is determined and an output size of the scanned pages is determined at 604. At 606, the number of pages scanned, and the output size is displayed to the user in real-time. If the user thinks, it is beyond his expectation/requirement, the user provides his input to optimize the output size through the user interface. Alternatively, the output size requirement can be automatically determined by the multi-function device based on configuration settings or pre-defined settings at the multi-function device. At 608, optimal scan setting/parameters for the document submitted for scanning, are determined. The optimal scan settings are determined based on the type of content in the document. To this end, type of content in the document is determined, specifically, type of content in the scanned pages is determined. Here segmentation techniques are applied on the scanned pages to determine the type of content. Any known or later developed segmentation methods to segment the content into textual content and image content, can be implemented. For example, here it is determined whether the content type in the scanned pages is textual type, image type or a combination of text and image. This is determined based on the content included in the already scanned pages of the document. At 610, based on the type of content in the scanned pages, the determined optimal scan setting/method is applied on the already scanned pages and other pages to be scanned. For example, if the type of content is image type, then JPEG quantization-based scan setting is applied. In another example, if the type of content is textual, the DPI-based scan setting is applied. In further example, if the type of content is a combination of text type and image type, then different compression techniques may be applied for the image content (can be referred to as image layer) and the textual content (can be referred to as text layer).

Finally, the determined optimal algorithm is applied to the already scanned pages and to the remaining pages to be scanned. This way, the user input to scan settings is not required as well as the user knowledge on scan setting parameters is not needed. The output size is continuously monitored and displayed to the user in real-time. At 612, the scanned file is finally output according to the size requirement.

The present disclosure proposes an intelligent model to optimize output size of a document submitted for scanning. Specifically, the disclosure automatically monitors, determines an optimal scan setting/method/algorithm, suggests, and applies to reduce/increase the output size while preserving scan quality. The optimal scan settings may be based on a system/multi-function device policy for the maximum allowed file size, or pre-defined optimization rules. The methods and systems optimize the output size without reprocessing the whole/already scanned document/pages. The methods and systems optimize the output size by preserving the quality of the text, image segments such as graphs/charts/images or the like. The methods and systems enhance the overall user experience. The methods and systems generate scanned file such that output file size is within the required limit (as required by the user and/or organization). As a result, the output scanned file can be sent as an attachment. The methods and systems allow the user to monitor the output file size and control the output file size during the scanning process. The methods and systems provide enhanced scan-to-email or scan-to-destination feature in the multi-function device.

The methods and systems intelligently automatically monitor the output size while the document is getting scanned at the multi-function device. The methods and systems further analyze the raw scanned images in order to make recommendations to the user for changing scan settings to optimize the output size. The user then confirms, and the recommended settings are applied to the already scanned raw images and to remaining pages to be scanned. The methods and systems assist users who are not familiar or who don't have adequate knowledge with the consequences of adjusting scan settings/parameters such as resolution, compression type, or the like.

The methods and systems continuously calculate output size and inform the user when the output size increases beyond the requirement and further suggests optimal scan settings such that output size is within the required limit while maintaining the quality of the scanned output. The methods and systems focus on calculating and displaying output size as scanning activity is progressed at the multi-function device such that the output size remains within the required size.

The present disclosure stores scanned pages in a temporary buffer. And scan settings are applied on the temporary buffer and then image processing happens. When a document is scanned, it passes through multiple phases for processing in an imaging module and each phase includes a dedicated memory to store the images output from that phase.

The present disclosure can have one or more application areas such as scan-to-email, archival storage of scanned images and so on.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art, An algorithm is generally perceived as a self-consistent sequence of steps leading to a desired result. The steps are those requiring physical manipulations of physical quantities, Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "receiving", "applying", "monitoring", "determining", "scanning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks; CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks; magnetic tape, or any other magnetic storage medium; CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for automatically determining one or more scan settings to manage an output size of a document submitted for scanning at a multi-function device, the method comprising:
   receiving the document for scanning from a user, wherein the document comprises one or more pages having content;

displaying an output size of scanned pages in real-time to the user via a user interface, as scanning activity is progressed at the multi-function device;

receiving an input from the user on the displayed output size;

based on the input from the user, determining the one or more scan settings to be applied on the already scanned pages and remaining pages of the document to be scanned, to manage an output size of an output scanned file to be generated;

applying the determined one or more scan settings such that the output size of the output scanned file is in accordance with a requirement; and outputting the output scanned file of a required size.

2. The method of claim 1, wherein managing the output size comprises decreasing or increasing the output size of the output scanned file.

3. The method of claim 1, further comprising, displaying the number of pages getting scanned to the user in real-time, via the user interface of the multi-function device.

4. The method of claim 1, wherein the one or more scan settings comprise at least: JPEG quantization-based scan setting, different compression-based scan setting, and DPI-based scan setting.

5. The method of claim 1, further comprising, applying JPEG quantization-based scan setting if the document comprises image data.

6. The method of claim 1, further comprising, applying different compression-based scan setting for textual content and image content if the document comprises a combination of the textual content and the image content.

7. The method of claim 1, further comprising, increasing, or decreasing Dots Per Inch (DPI) of textual content based on size of the textual content if the document comprises the textual content.

8. The method of claim 1, further comprising, continuously monitoring, and displaying the output size of the scanned pages till the document is scanned completely and/or the output scanned file is output.

9. A multi-function device to automatically determine one or more scan settings to manage an output size of a document submitted for scanning, the multi-function device comprising:

a scanning platform configured to receive the document for scanning from a user, wherein the document comprises one or more pages having content;

a scanner configured to scan the one or more pages of the document;

a user interface configured to:
display an output size of scanned pages in real-time to the user as scanning activity is progressed at the multi-function device; and
receive an input from the user on the displayed output size; and a controller configured to:
based on the input from the user, determine the one or more scan settings to be applied on the already scanned pages and remaining pages of the document to be scanned, to manage an output size of an output scanned file to be generated;
apply the determined one or more scan settings such that the output size of the output scanned file is in accordance with a requirement; and
output the output scanned file of a required size.

10. The multi-function device of claim 9, wherein the controller is configured to manage the output size of the output scanned file.

11. The multi-function device of claim 9, wherein the user interface is further configured to display the number of pages getting scanned to the user in real-time.

12. The multi-function device of claim 9, wherein the controller is further configured to apply JPEG quantization-based scan setting if the document comprises image content.

13. The multi-function device of claim 9, wherein the controller is further configured to apply different compression-based scan setting for textual content and image content if the document comprises a combination of the textual content and the image content.

14. The multi-function device of claim 9, wherein the controller is further configured to apply DPI-based scan setting, if the document comprises textual content, wherein the DPI-based scan setting comprises increasing, or decreasing Dots Per Inch (DPI) of the textual content based on size of the textual content.

15. The multi-function device of claim 9, wherein the controller is further configured to continuously monitor and display the output size of the scanned pages till the document is scanned completely and/or the output scanned file is output.

16. A device to automatically determine one or more optimal scan settings to manage an output size of a document submitted for scanning, the device comprises:

a scanning platform configured to receive the document for scanning from a user, wherein the document comprises one or more pages; and a controller configured to:
determine and control display of an output size of scanned pages in real-time to the user via a user interface, as scanning activity is progressed at the device;
based on the output size of the scanned pages, determine the one or more optimal scan settings for the already scanned pages and remaining pages of the document to be scanned;
apply the determined one or more determined optimal scan settings to the already scanned pages and the remaining pages of the document to be scanned such that an output size of an output scanned file to be generated is in accordance with a pre-defined requirement; and
output the output scanned file of a required size.

17. The device of claim 16, wherein the one or more optimal scan settings comprise: JPEG quantization-based scan setting, different compression-based scan setting and DPI-based scan setting.

18. The device of claim 16, wherein the controller is configured to monitor and control display of the output size of the scanned pages till the document is scanned completely.

19. The device of claim 16 further comprising the user interface configured to display the number of pages getting scanned to the user in real-time.

20. The device of claim 16, wherein the device is one of: a scanner, a multi-function device, or a mobile device.

* * * * *